United States Patent
Karri et al.

(10) Patent No.: US 12,417,111 B2
(45) Date of Patent: Sep. 16, 2025

(54) INTELLIGENT CONTAINER CONFIGURING USING AUGMENTED REALITY

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN); Abhishek Jain, Baraut (IN); Sowjanya Rao, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 17/469,741

(22) Filed: Sep. 8, 2021

(65) Prior Publication Data

US 2023/0072553 A1 Mar. 9, 2023

(51) Int. Cl.
*G06F 9/455* (2018.01)
*G06F 11/34* (2006.01)
(Continued)

(52) U.S. Cl.
CPC ...... *G06F 9/45558* (2013.01); *G06F 11/3409* (2013.01); *G06N 20/00* (2019.01);
(Continued)

(58) Field of Classification Search
CPC ............. G06F 9/45558; G06F 11/3409; G06F 2009/4557; G06F 2009/45591; G06N 20/00; G06T 19/006
See application file for complete search history.

(56) References Cited

U.S. PATENT DOCUMENTS 9,778,952 B1 * 10/2017 Sutton .................... G06F 9/541
10,019,287 B1 * 7/2018 Loughmiller ........... G06F 9/452
(Continued)

FOREIGN PATENT DOCUMENTS

CN 110333877 A 10/2019
CN 111708571 A 9/2020

OTHER PUBLICATIONS

Roy Oberhauser, VR-EAT: Visualization of Enterprise Architecture Tool Diagrams in Virtual Reality, 2020, Springer Nature Switzerland (Year: 2020).*

(Continued)

*Primary Examiner* — Dong U Kim
(74) *Attorney, Agent, or Firm* — CHIP LAW GROUP

(57) ABSTRACT

An augmented reality (AR) container orchestration system includes computer hardware including an AR system and a container orchestration platform. The AR system is configured to perform identifying a container to be deployed, displaying, to a user, a grid having a plurality of cells each of which are configured to receive a representation of the container, and redisplaying, using the AR system and to the user, the grid based upon a movement of the representation of the container to a particular position within the grid. The container orchestration platform is configured to perform identifying possible configurations for the container, and configuring the container based upon the movement of the representation of the container to the particular position. The includes a plurality of axes, and each axis of the plurality of axis represents a different configuration-related parameter of the configurations for the container.

20 Claims, 8 Drawing Sheets

(51) Int. Cl.
  *G06N 20/00* (2019.01)
  *G06T 19/00* (2011.01)
(52) U.S. Cl.
  CPC .... *G06T 19/006* (2013.01); *G06F 2009/4557* (2013.01); *G06F 2009/45591* (2013.01)

(56) References Cited

U.S. PATENT DOCUMENTS

| | | | |
|---|---|---|---|
| 10,430,216 B1* | 10/2019 | Loughmiller | G06F 3/0644 |
| 11,190,411 B1* | 11/2021 | Comazzetto | H04L 41/40 |
| 2014/0047084 A1 | 2/2014 | Breternitz et al. | |
| 2016/0232018 A1* | 8/2016 | Avila | G06F 9/45558 |
| 2016/0378531 A1* | 12/2016 | Dow | G06F 9/45558 |
| | | | 718/1 |
| 2019/0130645 A1* | 5/2019 | Verma | G06F 3/011 |
| 2019/0213767 A1* | 7/2019 | Verma | G06Q 10/10 |
| 2020/0236278 A1 | 7/2020 | Yeung et al. | |
| 2020/0278920 A1* | 9/2020 | Khakare | G06F 9/547 |
| 2020/0401436 A1* | 12/2020 | Yerli | G06F 3/011 |

OTHER PUBLICATIONS

"Cognitive deployment engine for containers in a Hybrid Cloud context," IP.com Prior Art Database Technical Disclosure, No. IPCOM000264781D, Jan. 26, 2021, 8 pg.

Oberhauser R. et al., "VR-EA: Virtual reality visualization of enterprise architecture models with ArchiMate and BPMN," In Int'l. Symposium on Business Modeling and Software Design, Jul. 1, 2019, pp. 170-187, Springer, Cham.

Mell, P. et al., The NIST Definition of Cloud Computing, National Institute of Standards and Technology, U.S. Dept. of Commerce, Special Publication 800-145, Sep. 2011, 7 pg.

* cited by examiner

INTELLIGENT CONTAINER CONFIGURING USING AUGMENTED REALITY

BACKGROUND

The present invention relates to computer-implemented microservices, and more specifically, to configuring and deploying microservices with containers using AR (Augmented Reality).

Software architecture is evolving into a microservice approach. Legacy approaches oftentimes involve a monolithic architecture using a large, tightly-coupled application. By comparison, microservices (also referred to as microservice architecture) are a cloud-native architectural approach in which a single application is composed of many loosely-coupled and independently-deployable smaller components or services (i.e., microservices) that are networked together (e.g., as nodes in a network).

The multitude of microservices that make up an application can be connected to one another in a multitude of different ways. For example, individual microservices can be connected in a chain (i.e., serially) and/or as a tree structure and share data amongst one another. For example, a first microservice can provide first dataset to a second microservice that uses that first dataset to generate a second dataset than is then provided to a third microservice.

Microservices typically have the following characteristics. They have their own technology stack, inclusive of the database and data management model. Additionally, microservices can communicate with one another over a combination of REST APIs, event streaming, and message brokers. Also, microservices can be organized by business capability with the line separating services often referred to as a bounded context.

There are a number of benefits of a microservice architecture over a monolithic architecture. These benefits include that the code can be updated more easily as new features or functionally can be added without modifying the entire application. Additionally, different stacks and different programming languages can be used for each of the different components. In other words, they can be independently deployable as well as independently modifiable. Still further, the different components can be scaled independently of one another, which reduces the waste and cost associated with having to scale entire applications because, for example, a single feature might be facing too much load. Loose coupling between microservices also builds a degree of fault isolation and better resilience into applications.

Contains are oftentimes used to deploy microservices. Containers are generally described as executable units of software in which application code is packaged, along with its libraries and dependencies, in common ways so that it can be run anywhere, whether it be on desktop, traditional IT, or the cloud. Containers take advantage of a form of operating system (OS) virtualization in which features of the OS are leveraged to both isolate processes and control the amount of CPU, memory, and disk that those processes have access to. Containers are small, fast, and portable—unlike a virtual machine, containers do not need include a guest OS in every instance and can, instead, simply leverage the features and resources of the host OS. Due to a combination of their deployment portability/consistency across platforms and their small size, containers are an ideal fit for modern development and application patterns, such as microservices, that can be built as regular code deployments in small increments.

Container orchestration is a technology used to manage the lifecycles of containers. More specifically, container orchestration can be used to control and automate certain tasks such as deploying a specified number of containers to a specified host and keep them running in a desired state; initiate, pause, resume, or roll back a change to a deployment (i.e., a rollout); automatically expose a container to the internet or to other containers; perform storage provisioning by mounting persistent local or cloud storage for the container; load balancing; automatic scaling in which new clusters are spun up to handle additional workload when traffic spikes; self-healing whereby a container is restarted or replace upon failure or taken down when failing to make a health-check requirement among others. For example, in deploying a new container, a container orchestration tool may identify the most appropriate host within a cluster (i.e., a set of nodes) to place the container and schedules the deployment. Once the container is running on the host, the container orchestration tool manages the lifecycle of the container according to a specification within the container's definition file. An example of a container orchestration platform is Kubernetes.

Automated container deployment using container orchestration can be used to replace many existing IT operations tasks and are useful to ensure compliance with company polices using configuration as code infrastructure. However, there is a need to for a streamlined process for ensuring security audit compliance, data integrity and resiliency compliance, customer SLA (service level agreement), among others within the container orchestration environment. Ensuring these compliance requirements oftentimes involves reconfiguring a container application under development or may already be running, which can be difficult for an IT operation/developer. In particular, there is a need for a mechanism that allows a developer to identify, for a container, common attributes that can be reused, such as container security configuration, network communication policy, storage backend type, hardware architecture, etc., and to provide the container with a best suited configuration.

SUMMARY

A computer-implemented process for configuring containers used for deploying a plurality of microservices using an augmented reality (AR) container orchestration system includes an AR system and a container orchestration platform. A container to be deployed is identified using the AR system. Possible configurations for the container are identified using the container orchestration platform. A grid having a plurality of cells each of which are configured to receive a representation of the container are displayed to a user using the AR system. The grid is redisplayed, using the AR system and to the user, based upon a movement of the representation of the container to a particular position within the grid. The container is configured, by the container orchestration platform, based upon the movement of the representation of the container to the particular position. The grid includes a plurality of axes, and each axis of the plurality of axis represents a different configuration-related parameter of the configurations for the container.

An augmented reality (AR) container orchestration system includes computer hardware including an AR system and a container orchestration platform. The AR system is configured to perform identifying a container to be deployed, displaying, to a user, a grid having a plurality of cells each of which are configured to receive a representation of the container, and redisplaying, using the AR system and to the user, the grid based upon a movement of the representation of the container to a particular position within the grid. The container orchestration platform is configured to perform identifying possible configurations for the container, and configuring the container based upon the movement of the representation of the container to the particular position. The includes a plurality of axes, and each axis of the plurality of axis represents a different configuration-related parameter of the configurations for the container.

A computer program product for configuring containers used for deploying a plurality of microservices using an augmented reality (AR) container orchestration system includes an AR system and a container orchestration platform includes computer readable storage medium having stored therein program code. The program code, which when executed by the AR container orchestration system, cause the AR development system to perform the following operations. A container to be deployed is identified using the AR system. Possible configurations for the container are identified using the container orchestration platform. A grid having a plurality of cells each of which are configured to receive a representation of the container are displayed to a user using the AR system. The grid is redisplayed, using the AR system and to the user, based upon a movement of the representation of the container to a particular position within the grid. The container is configured, by the container orchestration platform, based upon the movement of the representation of the container to the particular position. The grid includes a plurality of axes, and each axis of the plurality of axis represents a different configuration-related parameter of the configurations for the container.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
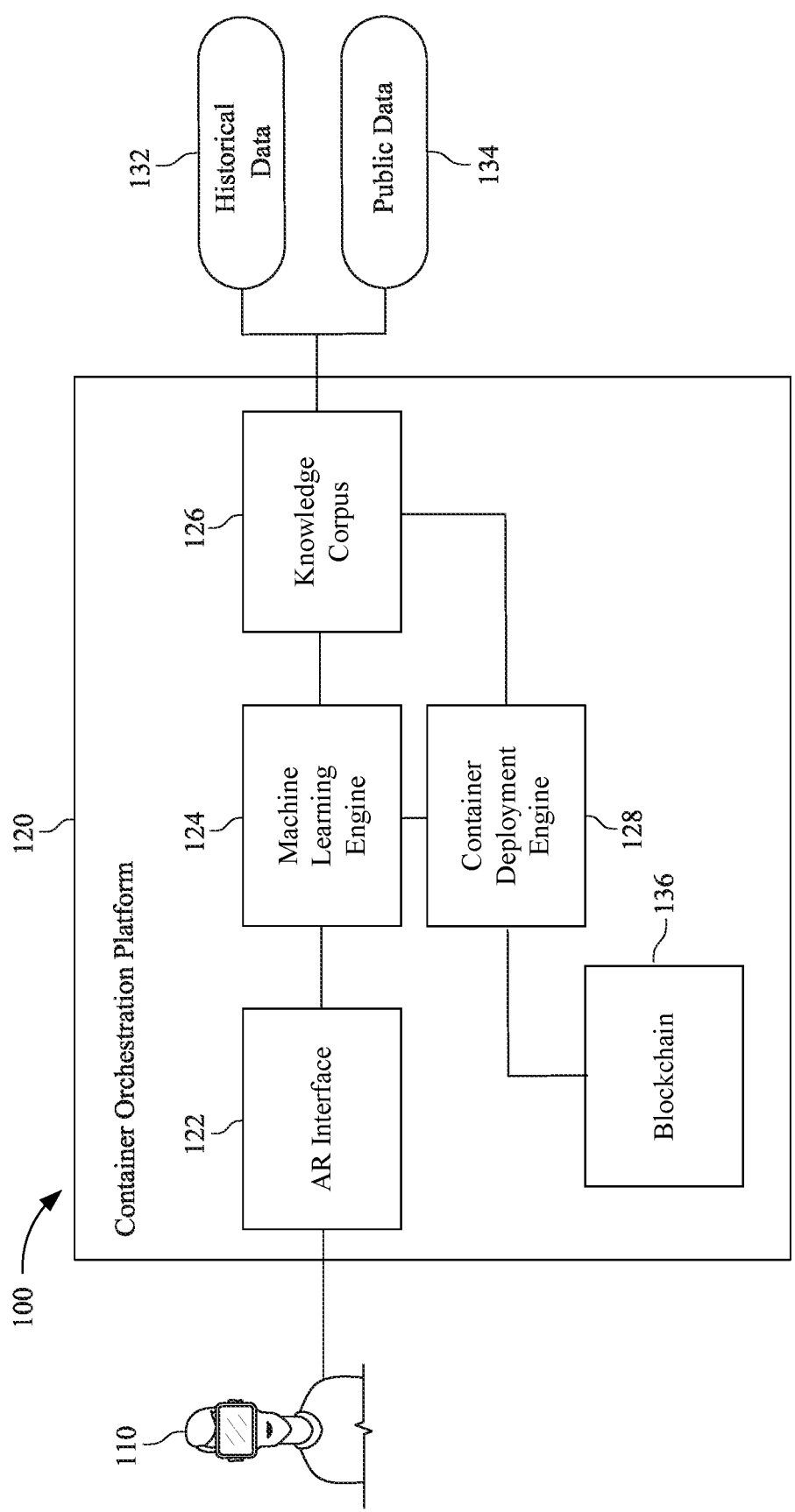
FIG. 1 is a block diagram illustrating an example AR container orchestration system including an AR system and as container orchestration platform according to an embodiment of the present invention.
Figure 2:
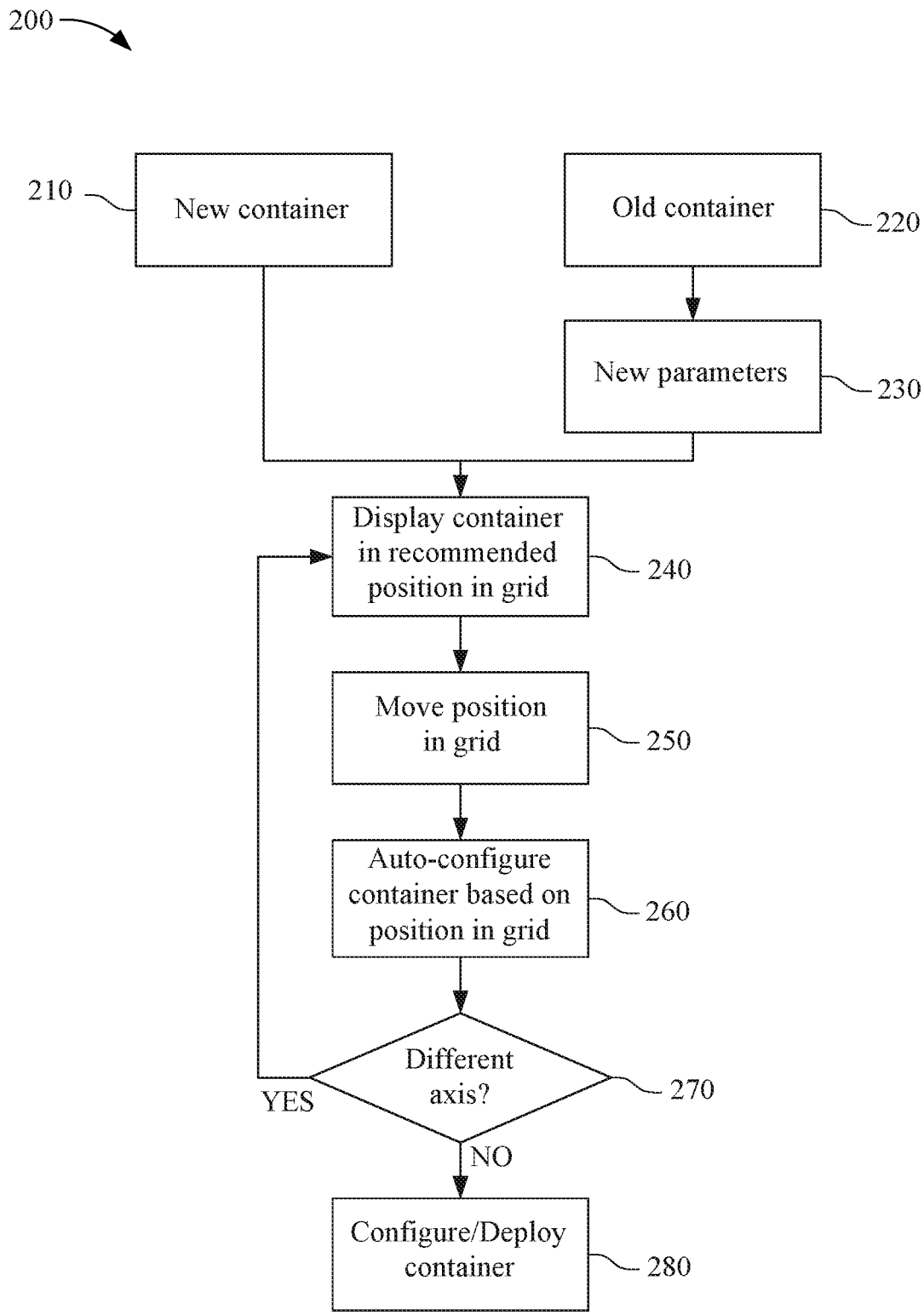
FIG. 2 is a block diagram illustrating an example method using the AR container orchestration system of FIG. 1 according to an embodiment of the present invention.

Reference is made to FIG. 1 and FIG. 2, which respectively illustrate an augmented reality (AR) container orchestration system 100 and methodology 200 for permitting a developer to visualize best-suited containers used for microservice for newly- or already-deployed containers using machine learning based on the reusable deployment configurations and compliance requirements in configuration as a code infrastructure. The AR container orchestration system 100 includes an AR system 110 (further described with regard to FIG. 5) and a container orchestration platform 120. The AR system communicates with the AR system 110 via an AR interface 122. Other aspects of the container orchestration platform 120 will be further discussed in concert with the operations illustrated in FIG. 3.

Figure 3:
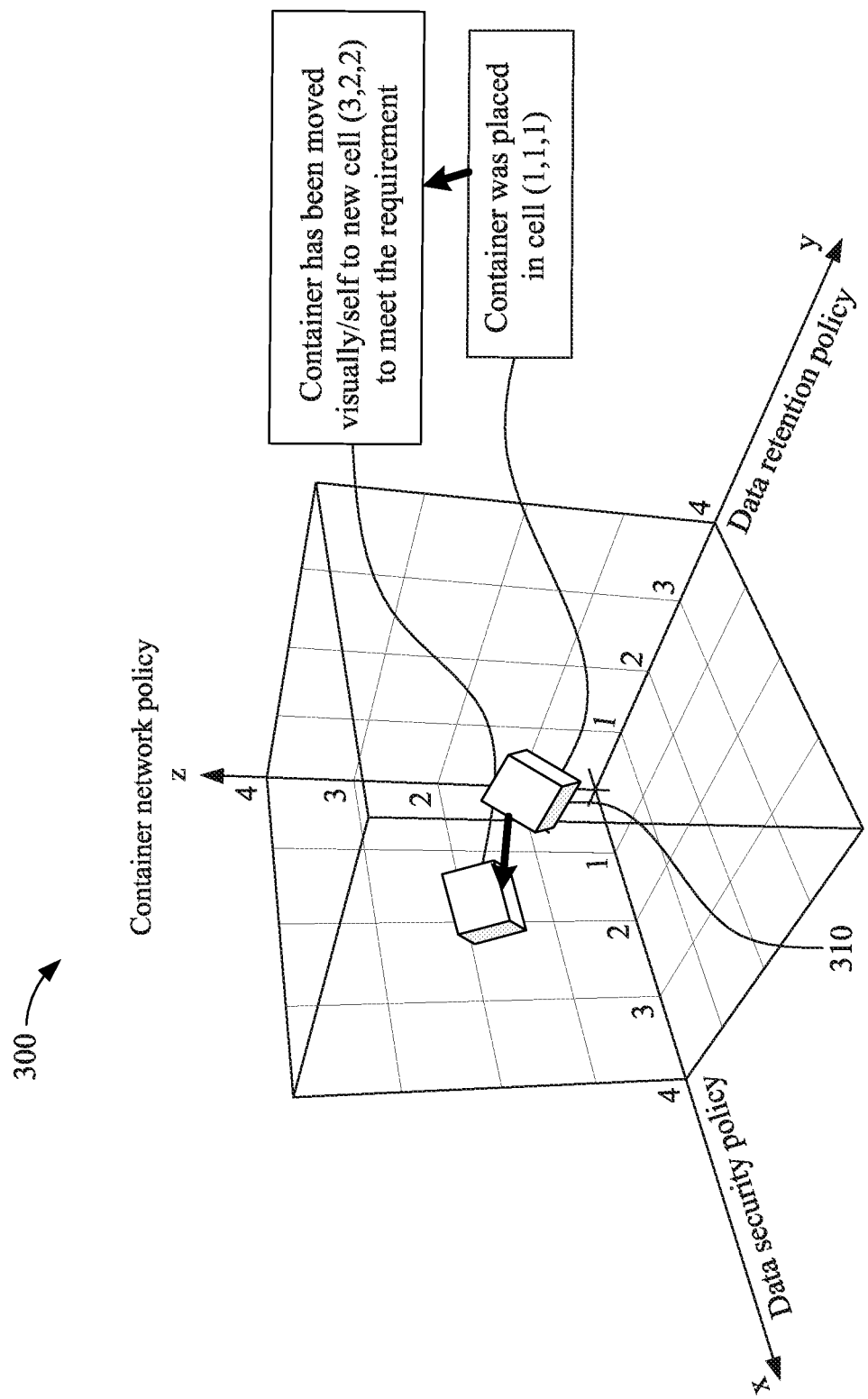
FIG. 3 is an exemplary grid being displayed in AR/VR space according to an embodiment of the present invention.

Referring to FIG. 3, the methodology begins by either identifying a new container to be configured in operation 210 or identifying an existing container in operation 220 to be reconfigured. Upon identifying the container to be configured/reconfigured, the container orchestration platform 120 identifies each and every possible configuration to be used for container. These configurations can include container security configuration, network communication policy, storage backend type, hardware architecture.

In operation 230, if an existing container is selected, the container orchestration platform 120 can use a knowledge corpus 126 that identifies new common vulnerabilities and exposures (CVE) from a public database 134 and/or industry improvements/suggestions for best suited deployment methods. For example, a new security policy may be required based on compliance changes and/or a new network policy may be based on a new change in the network in which the microservices within the container are to be deployed. With this information, the container orchestration platform 120 may identify new configuration parameters (and associated configuration parameters values) and/or identify previously-existing configurations parameters having newly-suggested configuration parameter values.

In operation 240, the AR system 110 presents a display of a grid 300 in AR/VR (virtual reality) space into which a representation of the container 310 can be placed. The representation of the container 310 is not limited in a particular manner. In certain aspects, the representation of the container 310 is configured to be received within a cell of the grid 300. In additional aspects, the representation of the container 310 can be changed to reflect the type of microservices being deployed within the container 310. Still further, the representation of the container 310 can be changed to reflect whether the container 310 has an additional grid associated therewith.

Although the present specification will describe the grid 300 as having three dimensions/axes, the grid 300 is not limited in this manner but those disclosures can also refer to two dimensions/axes or more than three dimensions/axes (3D). If there are only two configurations being illustrated, the grid 300 can be displayed, for example, as only have two axes/dimensions (2D). Additionally, as will be further discussed with regard to operation 270 and FIGS. 4A, 4B, the AR container orchestration system 100 is capable of handling and displaying more than three configurations in conjunction with the grid 300. Each axis (x, y, z) of the grid 300 represents a different configuration-related parameter for the container 310, and each coordinate position within the grid 300 represents a conjunction of the three configuration parameter values associated with the configurations represented by each axis (x, y, z) of the grid 300. The grid 300 can optionally display one or more of the configuration parameters values alongside each axis (x, y, z). In so doing, a developer can use the AR system 100 to visualize configurations related to the container 310 in the grid 300, and analyze the cells (i.e., the individual coordinate positions) of the grid 300, which will have different levels of combinations of configurations. There can also be a grid in which no configuration is present, and the developer can use the AR system 110 to assign different configuration-related parameters to each axis of the grid.

In certain aspects, the container 310 may already be placed within the grid 300 (e.g., the container 310 has already been configured or the AR container orchestration system 100 has determined a suggested initial location within the grid 300) or the container 310 may be positioned outside of the grid 300. In determining a suggested location within the grid 300, a machine learning engine 124, such as an artificial intelligence system, may access a knowledge corpus 126 that includes historical configuration files 132 for previously-deployed containers. The machine learning engine 124 can create a relationship mapping between the container 310 and prior container deployments having similar contexts to the container 310. The machine learning engine 124 can use the relationship mapping to mine these historical configuration files, for example based upon prior successful deployments and the similarities, to determine a suggested location(s), corresponding to particular configuration parameter values, for the selected container 310 within the grid 300.

For example, the machine learning engine 124 can analyze a new/existing container configuration requirement based on a known method, e.g., deep analysis of container image layer, to identify the used computer programs and algorithm, YAML configuration parameters, network component used in the microservice(s) within the container and the nature of I/O of the microservice(s). Some advance configuration parameters and their values can also be identified based on the historical deployment of a similar type of microservice(s) in the production and their past behavior/performance.

This suggested location(s), as grid coordinated, can then be communicated via the AR interface 122 to the AR system 110. The machine learning engine 124 can also rank the suggested locations with the best ranked location being the location in which the container 310 is initially displayed within the grid 300.

In operation 250, the container 310 can be moved within grid 300 automatically or manually. Upon the container 310 being moved within the 300, the AR system 110 redisplays the grid 300 in which the representation of the container 310 is moved within the grid 300 from a first coordinate position to a second coordinate position. For example, a user may employ the AR system 110 to graphically manipulate the container from the first coordinate position to the second coordinate position. Alternatively, a determination can be made using one or more portions of the AR container orchestration system 100 that in order to meet certain configuration requirements, the container 310 can be automatically moved from the first coordinate position, which does meet the configuration requirements, to the second coordinate position, which does meet the configuration requirements. The automatic movement can be performed upon the configuration requirements being determined or, alternatively, in response to the user requesting, using the AR system 100, that the container 310 be positioned within the grid 300 so as to meet the configuration requirement. In certain aspects, the AR system 100 may provide the user within alternative locations within the grid 300 and the user can select, using the AR system 100, a particular location into which to place the container 310.

In displaying the container 310, color coding can be enabled to alert a developer, for example, on any issues with a particular configuration. A warning can be provided, for example, with regard to a container 310 having security issue by showing the container in red within the grid 300. Conversely, if the container 310 has no issues, the container 310 can be displayed in green.

Although not illustrated, the AR system 110 can display one or more dependent containers within the same or different grid 300. Additionally, a developer can use the AR system 110 to add/remove/move more than a single container within the same grid 300. Additionally, a developer can also create more than a single grid 300 within a same VR field of view, for example, to aid the develop in ensuring that the selected container 310 is aligned with an IT architect's design. Once a container 310 is deployed, the container 310 can also influence other container configuration parameters, which can be shown as a dependent container with configuration impact because of the deployed container 310 and the dependent container placement location can be changed based on the new configuration.

In operation 260, based upon the change of the coordinate position of the container 310 within the grid, the container 310 is automatically reconfigured using the container deployment engine 128 based upon the configuration parameter values associated with the particular coordinate position.

Optionally, anytime a coordinate position of the container 310 within the grid 300 is changed, then a blockchain-enabled software module 136 can be invoked to tracking the change in the coordinate position. The blockchain module 136 can also be used to track how the coordinate position of the container 310 was changed and responsible persona(s) for the change. The AR container orchestration platform 120 can also be security-enabled so as to allow only authorized users to access any cluster-wide configuration parameter or controller application that is running within the container orchestration platform 120.

In operation 270, a determination can be made that at least one different axis should be displayed within the grid 300. For example, if more than 3 configuration parameters for a particular container 310 exits, the AR system 110 can automatically suggest to the user new axis parameters from which the user can select. Additionally, based on the identified additional axis for these other configuration parameters, a user can drill down into a particular location in the grid 300 to arrive at a different grid 300 in AR/VR space and evaluate the container using that different grid with its associated configuration parameters.

Figure 4A:
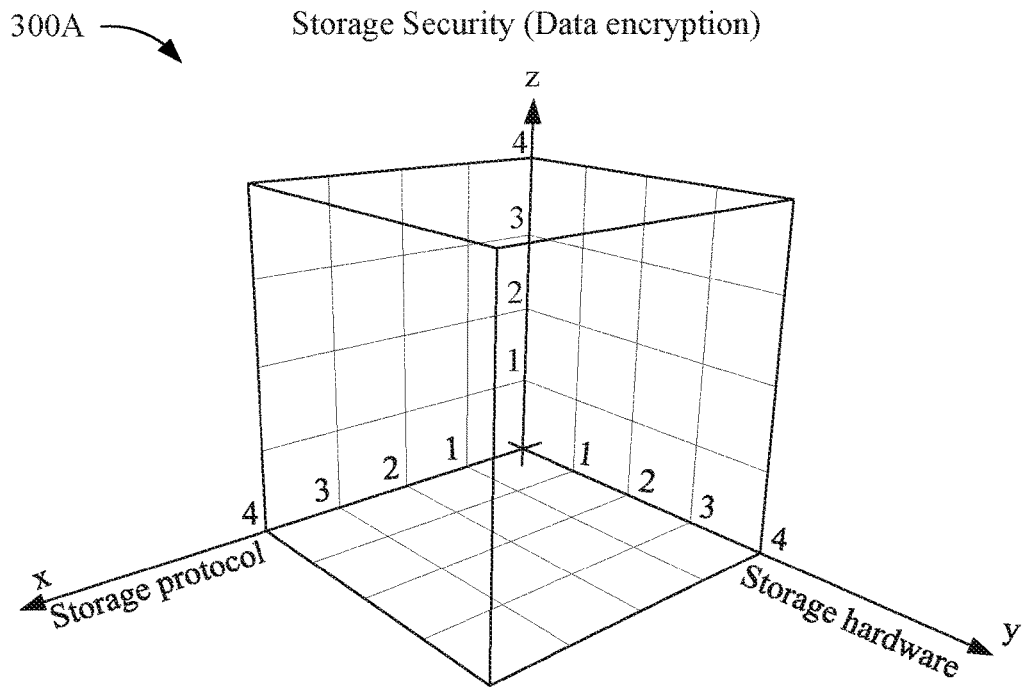
FIGS. 4A, 4B are exemplary additional grids being displayed in AR/VR space according to an embodiment of the present invention.
Figure 4B:
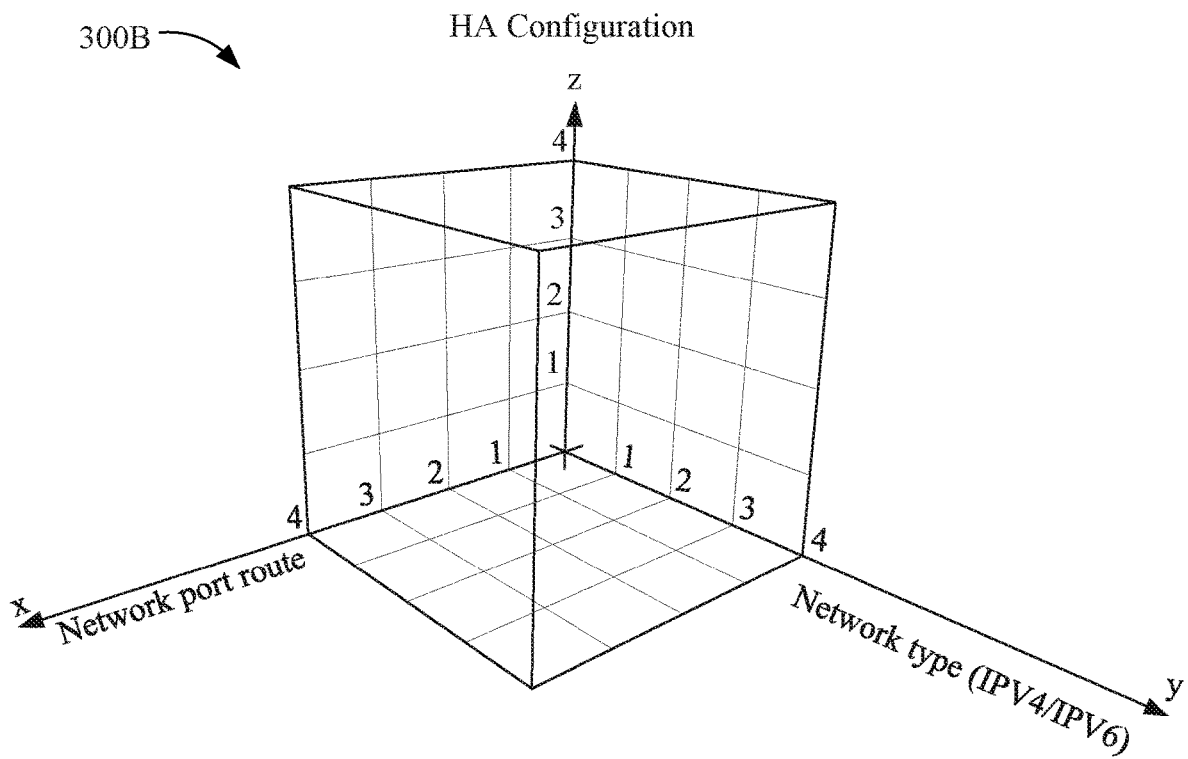

FIGS. 4A, 4B illustrate an exemplary instance of more than three configuration parameters. For example, in an instance in which a microservice interacts with a database and is deployed using a container, configuration parameters could be storage protocol type, storage hardware type, storage security configuration, network security, HA configuration, data resiliency support, application security requirement (e.g., port/route rules), and computer resource requirement. Referring to FIG. 4, a developer/user can use a 3D representation to see just three parameters (e.g., storage security, storage protocol, storage hardware) within the grid 300A. However, the AR container orchestration system 100 can provide the developer with an additional grid 300B, in which additional configuration parameters (e.g., HA configuration, network port route, and network type) are illustrated.

Although not limited in this manner, the AR container orchestration system 100 can intelligently group certain of the configuration parameters. For example, the AR container orchestration system 100 can display all storage parameters in a single grid 300A so that the developer can first choose a preferred storage type for the particular container 310. The AR container orchestration system 100 can then move to the next grid 300B, which displays network-related configurations. This process can continue until all of the configuration parameters associated with a particular container 310 are selected. Alternatively, the AR container orchestration system 100 can provide the user, via the AR system 100, to select one or more particular groups configuration parameters to be simultaneous presented within a grid 300.

In operation 280, configuration/reconfiguration of the container 310 within the grid 300 can be completed based upon the coordinate position of container 310 and the associated configuration parameters associated with the coordinate position. Additionally, the container orchestration platform 120 can utilize a container deployment engine 128 to cause the container 310 to be deployed in a manner consistent with known container deployment engines 128.

Figure 5:
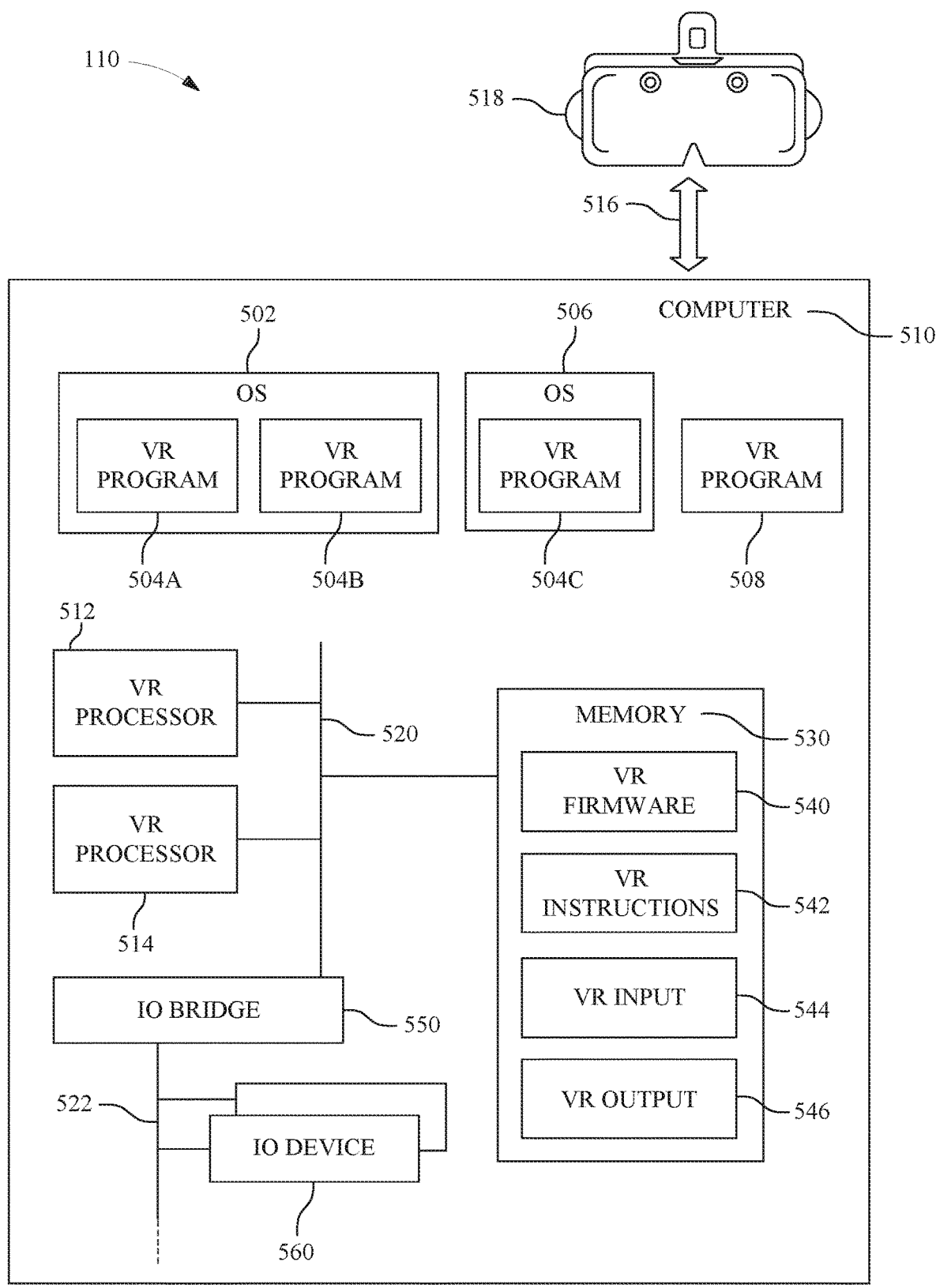
FIG. 5 is a block diagram illustrating an example computer hardware system for implementing the AR system of FIG. 1

FIG. 5 is an example of an example of the AR system 110 previously illustrated in FIG. 1. As shown, the AR system 110 includes an audio/video (A/V) headset 518, as referred to as smart glasses, augmented reality device or a virtual reality headset. The AR system 110 also includes a VR computer 510. Although illustrated as being separate from the headset 518, one or more portions of the VR computer 510 can be embedded within the headset 518. The example AR system 110, and/or components thereof, are not intended to be limiting as to the present disclosure.

The VR computer 510 can include one or more VR processors 512, 514, which can be a single processor or a multi-threaded processor, a general purpose or a special purpose processor, a co-processor, or any of a variety of processing devices that can execute computing instructions. If one or more portions of the VR computer 510 are separate from the headset 518, interface 516 couples VR computer 510 to the headset 518. The VR processors 512, 514 can be connected by memory interface 520 to memory 530, which can be a cache memory, a main memory, a flash memory, or a combination of these or other varieties of electronic hardware devices capable of storing information and, optionally, making the information, or locations storing the information within the memory, accessible to the VR processors 512, 514. The VR computer 510 can include an IO bridge 350, which can be connected to the memory 530 and/or VR processors 512, 514 by a memory interface 320. The IO bridge 550 can interface with the memory interface 520 to IO devices, such as IO device 560. The interface 522 can be any of a variety of IO interfaces, such as a PCI-Express (PCI-E) bus, and IO bridge 550 can, correspondingly, be a PCI-E bridge, and IO device 560 can be a PCI-E device (e.g., a disk drive), or PCI-E adapter (e.g., a network interface card, or a disk adapter). The IO devices 560-an be any of a variety of peripheral IO devices or IO adapters connecting to peripheral IO devices. For example, IO device 560 can be a graphic card, keyboard or other input device, a hard drive or other storage device, a network interface card, etc. Additionally, the AR system 110 can communicate with other devices, such as the container orchestration platform 120 illustrated in FIG. 1, using the IO device 560.

The VR computer 510 can include instructions executable by one or more of the VR processors (or, processing elements, such as threads of a VR processor) 512, 514. As illustrated, VR computer 510 includes a plurality of programs, such as VR programs 504A, 504B, 504C (collectively, "VR programs 504"), and 508, and operating systems OS 502 and 506. The VR programs 504 can be, for example, an application program (e.g., an application for generating VR expressions), a function of an operating system (e.g., a device driver capable of operating an IO device, such as 560), or a utility or built-in function of a computer, such as 510. A VR program 504 can be a hypervisor, and the hypervisor can, for example, manage sharing resources of the computer (e.g., a VR processor or regions of a memory, or access to an IO device) among a plurality of programs or OSes. A VR program 504 can be a program that embodies the methods, or portions thereof, of the disclosure. For example, a VR program 504 can be a program that executes on a VR processor 512, 514 of VR computer 510 to perform method 200 of FIG. 2, or portions and/or modifications thereof, within the scope of the present disclosure.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 6:
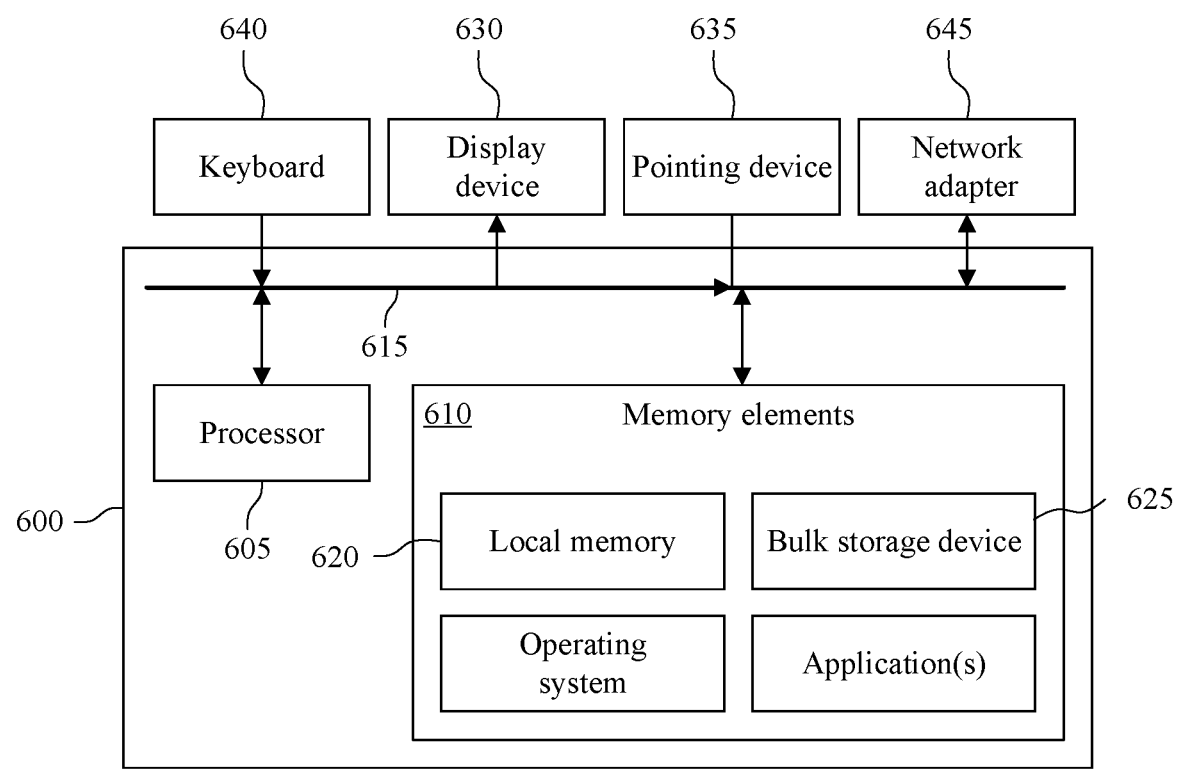
FIG. 6 is a block diagram illustrating an example of computer hardware system for implementing the development server of FIG. 2.

FIG. 6 is a block diagram illustrating example architecture for a data processing service 600 for serving as the container orchestration platform 120. The data processing system 600 can include at least one processor 605 (e.g., a central processing unit) coupled to memory elements 610 through a system bus 615 or other suitable circuitry. As such, the data processing system 600 can store program code within the memory elements 610. The processor 605 can execute the program code accessed from the memory elements 610 via the system bus 615. It should be appreciated that the data processing system 600 can be implemented in the form of any system including a processor and memory that is capable of performing the functions and/or operations described within this specification. For example, the data processing system 600 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 610 can include one or more physical memory devices such as, for example, local memory 620 and one or more bulk storage devices 625. Local memory 620 refers to random access memory (RAM) or other non-persistent memory device(s) generally used during actual execution of the program code. The bulk storage device(s) 625 can be implemented as a hard disk drive (HDD), solid state drive (SSD), or other persistent data storage device. The data processing system 600 also can include one or more cache memories (not shown) that provide temporary storage of at least some program code in order to reduce the number of times program code must be retrieved from the local memory 620 and/or bulk storage device 625 during execution.

Input/output (I/O) devices such as a display 630, a pointing device 635 and, optionally, a keyboard 640 can be coupled to the data processing system 600. The I/O devices can be coupled to the data processing system 600 either directly or through intervening I/O controllers. For example, the display 630 can be coupled to the data processing system 600 via a graphics processing unit (GPU), which may be a component of the processor 605 or a discrete device. One or more network adapters 645 also can be coupled to data processing system 600 to enable the data processing system 600 to become coupled to other systems, computer systems, remote printers, and/or remote storage devices through intervening private or public networks. Modems, cable modems, transceivers, and Ethernet cards are examples of different types of network adapters 645 that can be used with the data processing system 600.

As pictured in FIG. 6, the memory elements 610 can store the components of the container orchestration platform of FIG. 1. Being implemented in the form of executable program code, these components of the data processing system 600 can be executed by the data processing system 600 and, as such, can be considered part of the data processing system 600.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
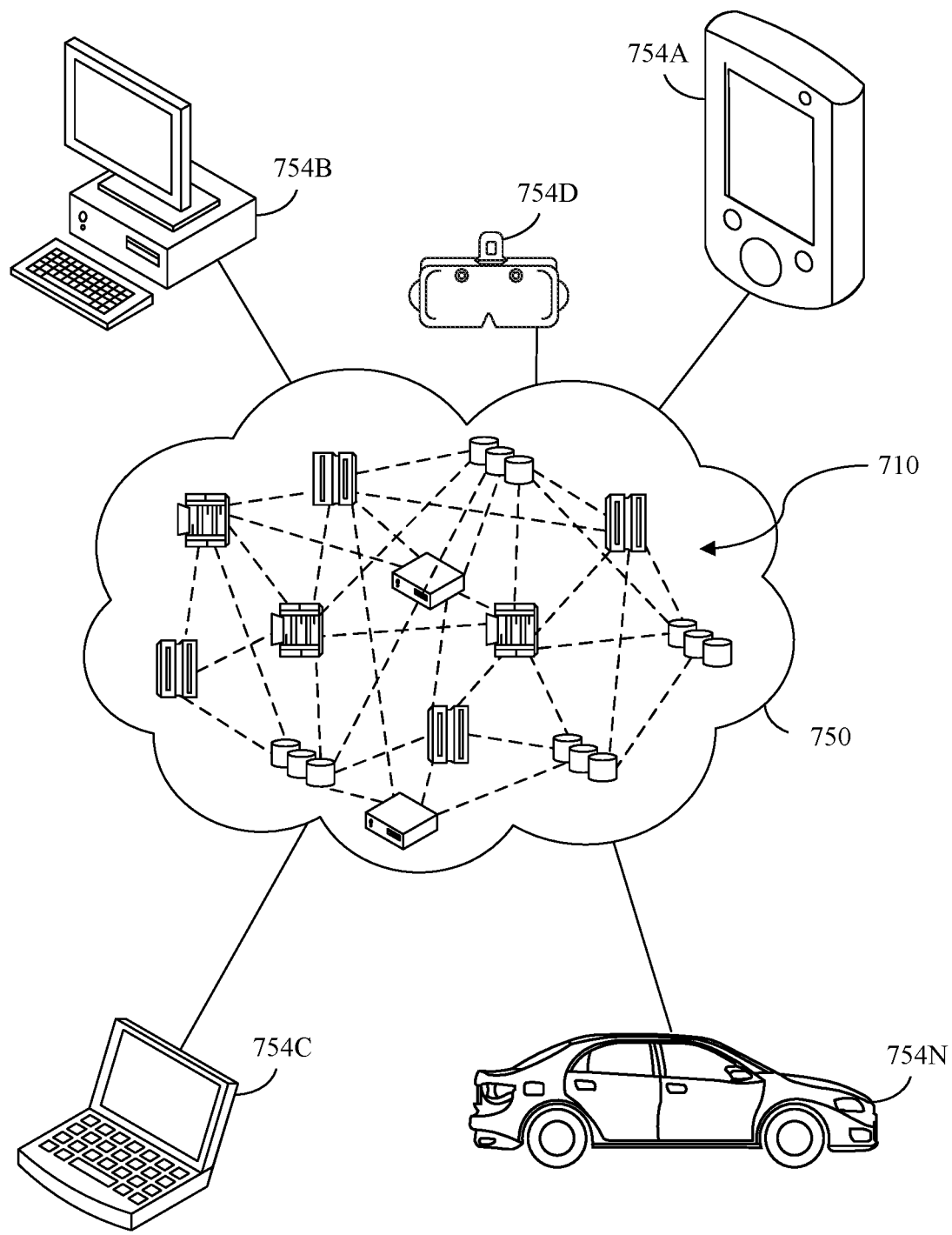
FIG. 7 depicts a cloud computing environment according to an embodiment of the present invention.

Referring now to FIG. 7, illustrative cloud computing environment 750 to be used with the API optimizing system is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, VR headset 754D, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
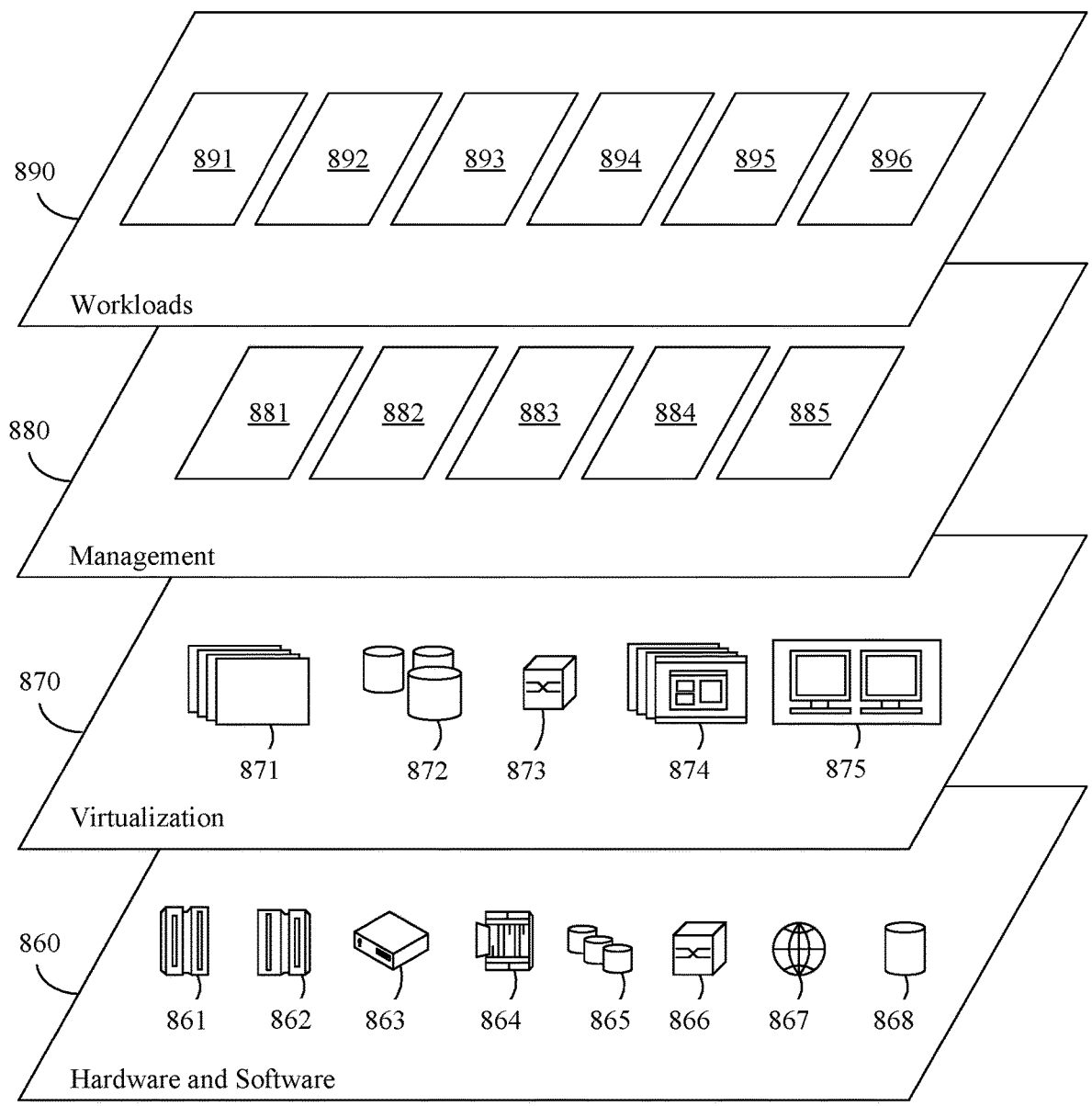
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below.

Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and operations of the container orchestration platform 896.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented process for configuring containers used for deploying a plurality of microservices using an augmented reality (AR) container orchestration system including an AR system and a container orchestration platform including a blockchain enabled software, the computer-implemented process comprising:
   identifying, using the AR system, a container to be deployed;
   identifying, using the container orchestration platform, possible configurations for the container;
   displaying, using the AR system and to a user, a first grid having a plurality of cells each of which is configured to receive a representation of the container;
   tracking, using the blockchain enabled software, a movement of the container to a particular position within the first grid;
   redisplaying, using the AR system and to the user, the first grid based upon the tracked movement of the container to the particular position within the first grid, wherein the redisplaying of the first grid includes moving the representation of the container to the particular position within the first grid; and
   configuring, by the container orchestration platform, the container based upon the movement of the representation of the container to the particular position, wherein
      the first grid includes a plurality of axes, and each axis of the plurality of axes represents a respective configuration-related parameter of a first plurality of configuration-related parameters of the possible configurations,
      the first plurality of configuration-related parameters represented by the plurality of axes includes at least two of container security configuration, network communication policy, and storage backend type, and
      the configuring of the container is further based upon a combination of new configuration-related parameters associated with the plurality of axes and corresponding to the particular position within the first grid.

2. The computer-implemented process of claim 1, further comprising causing, by the container orchestration platform, deployment of the plurality of microservices using the container.

3. The computer-implemented process of claim 1, further comprising:
   selecting, by the AR system, the container within the first grid; and
   displaying, by the AR system, based on the selection of the container, a second grid with a second plurality of configuration-related parameters respectively associated with a plurality of axes of the second grid.

4. The computer-implemented process of claim 1, further comprising determining, by a machine learning engine of the container orchestration platform, the particular position for the container within the first grid, wherein
   the particular position is determined based on the possible configurations of the container, and historical data including configurations of prior container deployments.

5. The computer-implemented process of claim 4, wherein the movement of the representation of the container is automatically performed based upon the particular position.

6. The computer-implemented process of claim 4, further comprising:
   presenting, by the AR system, the particular position to the user; and
   receiving, by the AR system, from the user, an indication of the movement of the representation of the container.

7. The computer-implemented process of claim 1, wherein the container is a new container to be configured.

8. The computer-implemented process of claim 1, wherein the container is a previously-deployed container to be re-configured using at least one new configured-related parameter.

9. An augmented reality (AR) container orchestration system, comprising:
   computer hardware including an AR system and a container orchestration platform including a blockchain enabled software, wherein
      the AR system is configured to:
         identify a container to be deployed; and
         display, to a user, a first grid having a plurality of cells each of which is configured to receive a representation of the container;
      the container orchestration platform is configured to:
         track, using the blockchain enabled software, a movement of the container to a particular position within the first grid;
      the AR system is further configured to:
         redisplay, to the user, the first grid based upon the tracked movement of the container to the particular position within the first grid, wherein the redisplaying of the first grid includes moving the representation of the container to the particular position within the first grid;
      the container orchestration platform is further configured to:
         identify possible configurations for the container; and
         configure the container based upon the movement of the representation of the container to the particular position, wherein
            the first grid includes a plurality of axes, and each axis of the plurality of axes represents a respective configuration-related parameter of a first plurality of configuration-related parameters of the possible configurations, the first plurality of configuration-related parameters represented by the plurality of axes includes at least two of container security configuration, network communication policy, and storage backend type, and the configuration of the container is further based upon a combination of new configuration-related parameters associated with the plurality of axes and corresponding to the particular position within the first grid.

10. The AR container orchestration system of claim 9, wherein the container orchestration platform is further configured to cause deployment of a plurality of microservices using the container.

11. The AR container orchestration system of claim 9, wherein the AR system is further configured to:
select the container within the first grid; and
display, based on the selection of the container, a second grid with a second plurality of configuration-related parameters respectively associated with a plurality of axes of the second grid.

12. The AR container orchestration system of claim 9, wherein the container orchestration platform is further configured to determine, using a machine learning engine of the container orchestration platform, the particular position for the container within the first grid, wherein
the particular position is determined based on the possible configurations of the container, and historical data including configurations of prior container deployments.

13. The AR container orchestration system of claim 12, wherein the movement of the representation of the container is automatically performed based upon the particular position.

14. The AR container orchestration system of claim 12, wherein the AR system is further configured to:
present the particular position to the user; and
receive, from the user, an indication of the movement of the representation of the container.

15. The AR container orchestration system of claim 9, wherein the container is a new container to be configured.

16. The AR container orchestration system of claim 9, wherein the container is a previously-deployed container to be re-configured using at least one new configured-related parameter.

17. A computer program product for configuring containers used for deploying a plurality of microservices using an augmented reality (AR) container orchestration system including an AR system and a container orchestration platform including a blockchain enabled software, the computer program product comprising:
a computer readable storage medium having stored therein a program code, the program code, which when executed by a computer hardware system, cause the computer hardware system to perform:
identifying, using the AR system, a container to be deployed;
identifying, using the container orchestration platform, possible configurations for the container;

displaying, using the AR system and to a user, a first grid having a plurality of cells each of which is configured to receive a representation of the container;
tracking, using the blockchain enabled software, a movement of the container to a particular position within the first grid;
redisplaying, using the AR system and to the user, the first grid based upon the tracked movement of the container to the particular position within the first grid, wherein the redisplaying of the first grid includes moving the representation of the container to the particular position within the first grid; and
configuring, by the container orchestration platform, the container based upon the movement of the representation of the container to the particular position, wherein
the first grid includes a plurality of axes, and each axis of the plurality of axes represents a respective configuration-related parameter of a first plurality of configuration-related parameters of the possible configurations,
the first plurality of configuration-related parameters represented by the plurality of axes includes at least two of container security configuration, network communication policy, and storage backend type, and
the configuring of the container is further based upon a combination of new configuration-related parameters associated with the plurality of axes and corresponding to the particular position within the first grid.

18. The computer program product of claim 17, wherein the program code further causes the computer hardware system to perform:
causing, using the container orchestration platform, deployment of the plurality of microservices using the container; and
receiving, using the AR system, from the user, an indication of the movement of the representation of the container.

19. The computer program product of claim 17, wherein the program code further causes the computer hardware system to perform:
selecting, using the AR system, the container within the first grid; and
displaying, using the AR system, based on the selection of the container, a second grid with a second plurality of configuration-related parameters respectively associated with a plurality of axes of the second grid.

20. The computer program product of claim 17, wherein the program code further causes the computer hardware system to perform determining, by a machine learning engine of the container orchestration platform, the particular position for the container within the first grid, wherein
the particular position is determined based on the possible configurations of the container, and historical data including configurations of prior container deployments, and
the movement of the representation of the container is automatically performed based upon the particular position.

* * * * *